US006758122B2

(12) United States Patent
Kao

(10) Patent No.: US 6,758,122 B2
(45) Date of Patent: Jul. 6, 2004

(54) GUARD AND CONTROL ASSEMBLY FOR A COMPOUND MITER SAW

(75) Inventor: Mei-Lan Kao, Taichung Hsien (TW)

(73) Assignee: P&F Brother Industrial Corporation, Taichung (TW)

( * ) Notice: Subject to any disclaimer, the term of this patent is extended or adjusted under 35 U.S.C. 154(b) by 0 days.

(21) Appl. No.: 10/414,091

(22) Filed: Apr. 16, 2003

(65) Prior Publication Data

US 2004/0060407 A1 Apr. 1, 2004

(30) Foreign Application Priority Data

Sep. 26, 2002 (TW) .................................... 91215195 U

(51) Int. Cl.[7] ............................ B26D 5/00; B23D 45/04

(52) U.S. Cl. ............................ 83/379; 83/478; 83/544; 192/130

(58) Field of Search ............................ 83/397, 471.3, 83/477.1, 544, 698.11, 478, 573, 860, 589, 490, 676; 192/129 R, 130, 131 R, 131 H, 132, 133, 134–137, 129, 129 B; 144/251.1, 251 R; 30/391

(56) References Cited

U.S. PATENT DOCUMENTS 5,370,025 A * 12/1994 Itzov ........................... 83/397
5,531,147 A * 7/1996 Serban ........................ 83/478
5,724,875 A * 3/1998 Meredith et al. ............. 83/397
6,182,548 B1 * 2/2001 Meredith et al. ............. 83/397
6,279,442 B1 * 8/2001 Chang ......................... 83/397
6,415,699 B1 * 7/2002 Bettacchini et al. .......... 83/397
2002/0066346 A1 * 6/2002 Gass et al. ...................... 83/58
2002/0134211 A1 * 9/2002 Bettacchini et al. .......... 83/397
2002/0170404 A1 * 11/2002 Peot et al. ..................... 83/478
2003/0037655 A1 * 2/2003 Chang ......................... 83/397

* cited by examiner

*Primary Examiner*—Allan N. Shoap
*Assistant Examiner*—Ghassem Alie
(74) *Attorney, Agent, or Firm*—Rosenberg, Klein & Lee

(57) ABSTRACT

A guard assembly for a compound miter saw includes an upper blade guard assembly, a lower blade guard assembly having a movable guard pivotally mounted in the upper blade guard assembly and a linkage assembly. The lower blade guard is pivotally mounted in the upper blade guard assembly. The linkage assembly including an inner link pivotally interconnected with the movable guard and the upper blade guard assembly controls the movement of the guard. A lock release mounted on the upper blade guard assembly locks the movable guard in position.

6 Claims, 8 Drawing Sheets

GUARD AND CONTROL ASSEMBLY FOR A COMPOUND MITER SAW

BACKGROUND OF THE INVENTION

1. Field of the Invention

The present invention relates to a guard and control assembly, and more particularly to a guard and control assembly for a compound miter saw and that will completely cover a saw blade in the miter saw.

2. Description of Related Art

Compound miter saws are used to cut a piece of metal, wood or other material at a precise angle. Most compound miter saws today incorporate a circular saw to cut pieces. If no blade guard is mounted around the circular saw in the miter saw, the circular saw is very hazardous.

With reference to FIG. 8, a compound miter saw (not numbered) comprises a base (91), a miter device (92), a turntable (not numbered) and a cutting assembly (93). The turntable with the miter device (92) is rotatably mounted in the base (91) and has a top surface (not shown), and the cutting assembly (93) is pivotally mounted on the turntable. The cutting assembly (93) has a motor assembly (not shown), a housing (94), a saw blade (95), a blade guard (not numbered), a blade mounting disk (97), an inside blade guard linkage (not shown) and an outside blade guard linkage (98). The housing (94) is pivotally mounted on the turntable and has a side (not numbered). The motor assembly is mounted in the housing (94). The saw blade (95) is connected to the motor assembly with the blade mounting disk (97) and is rotated by the motor assembly at the side of the housing (94). A portion of the saw blade (95) extends out of the housing (94) for cutting. The inside blade guard linkage and the outside blade guard linkage (98) are respectively mounted in the housing (94) and each has an outside end (not numbered) attached to the blade guard. The blade guard has an inside pivotal guard (961) and an outside pivotal guard (962). The inside pivotal guard (961) is attached to the inside blade guard linkage. The outside pivotal guard (962) is attached to the outside blade guard linkage (98). The outside and the inside pivotal guards (961, 962) are respectively pivotally connected to the outside ends of the inside and the outside blade guard linkages (98). The inside pivotal guard (961) and the outside pivotal guard (962) cover most of the exposed portion of the saw blade (95).

When the cutting assembly (93) is pivoted toward the base (91), the inside blade guard linkage and the outside blade guard linkage (98) will respectively pivot the inside and the outside pivotal guards (961, 962) upward to expose the saw blade (95) so a piece (not numbered) can be cut.

However, the conventional guard assembly for a compound miter saw does not efficiently cover the saw blade (95). When a person uses the compound miter saw to cut a piece, the person is always in front of the compound miter saw. A portion of the saw blade (95) facing forward is exposed. The exposed portion of the saw blade (95) poses a significant personal hazard to the person using the compound miter saw. The person using the compound miter saw may be injured easily by the saw blade (95).

Besides, the two pivotal guards (961, 962) are pivoted a specific angular displacement by the inside blade guard linkage and the outside blade guard linkage (98) to expose only a portion of the saw blade (95), respectively. Consequently, the angular displacement of the two pivotal guards (961, 962) are limited, which limits the height of a piece that can be cut. The conventional guard assembly narrows the applications of the compound miter saw.

The present invention provides a guard and control assembly for a compound miter saw to mitigate or obviate the aforementioned problems.

SUMMARY OF THE INVENTION

The main objective of the invention is to provide a guard and control assembly for a compound miter saw to efficiently cover a saw blade of a miter saw.

Another objective of the invention is to provide a safe compound miter saw to protect a person using the compound miter saw from hazards associated with the compound miter saw.

Other objectives, advantages and novel features of the invention will become more apparent from the following detailed description when taken in conjunction with the accompanying drawings.

DETAILED DESCRIPTION OF PREFERRED EMBODIMENT

Figure 1:
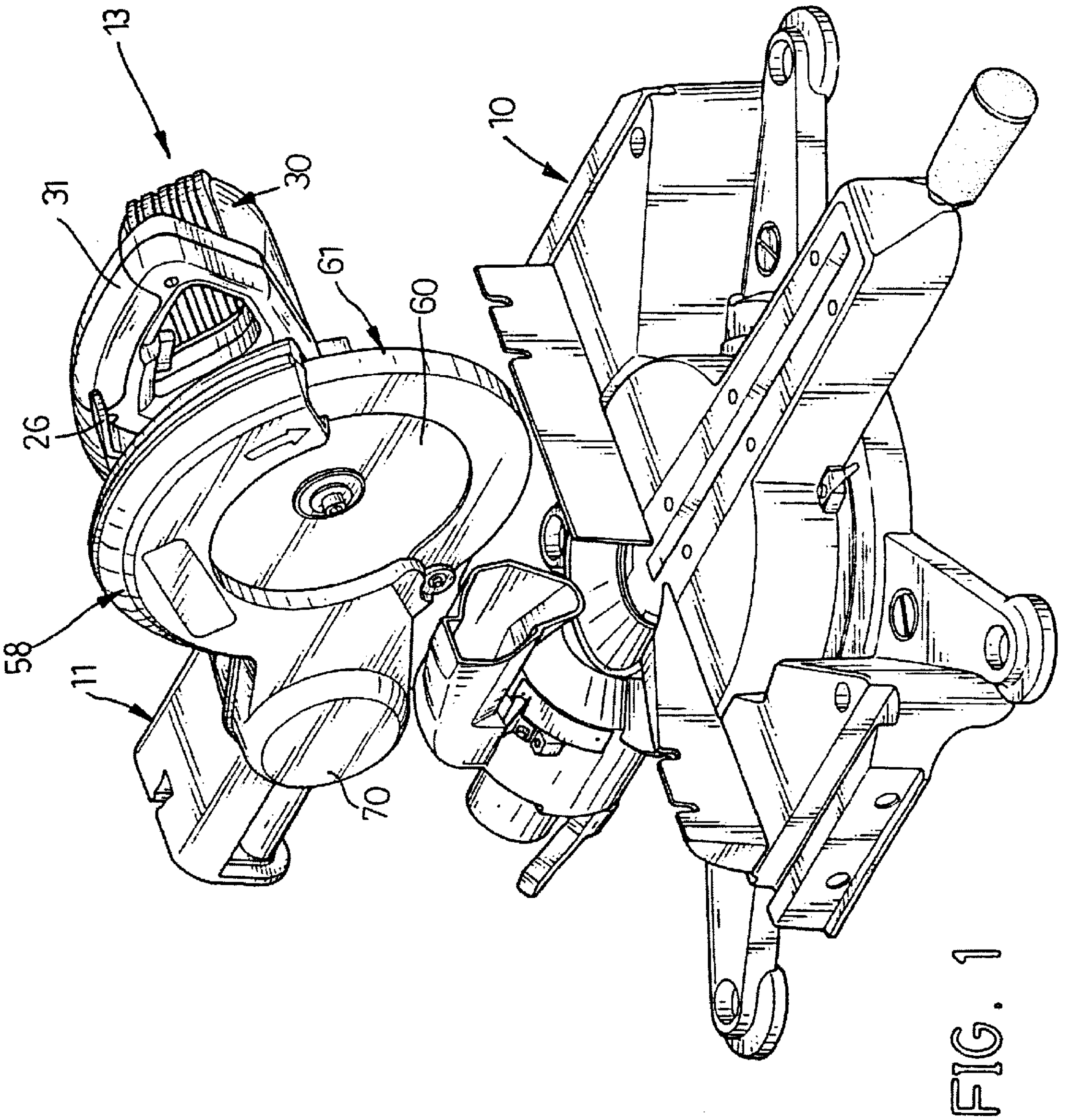
FIG. 1 is a perspective view of a compound miter saw with a guard and control assembly in accordance with the present invention.
Figure 2:
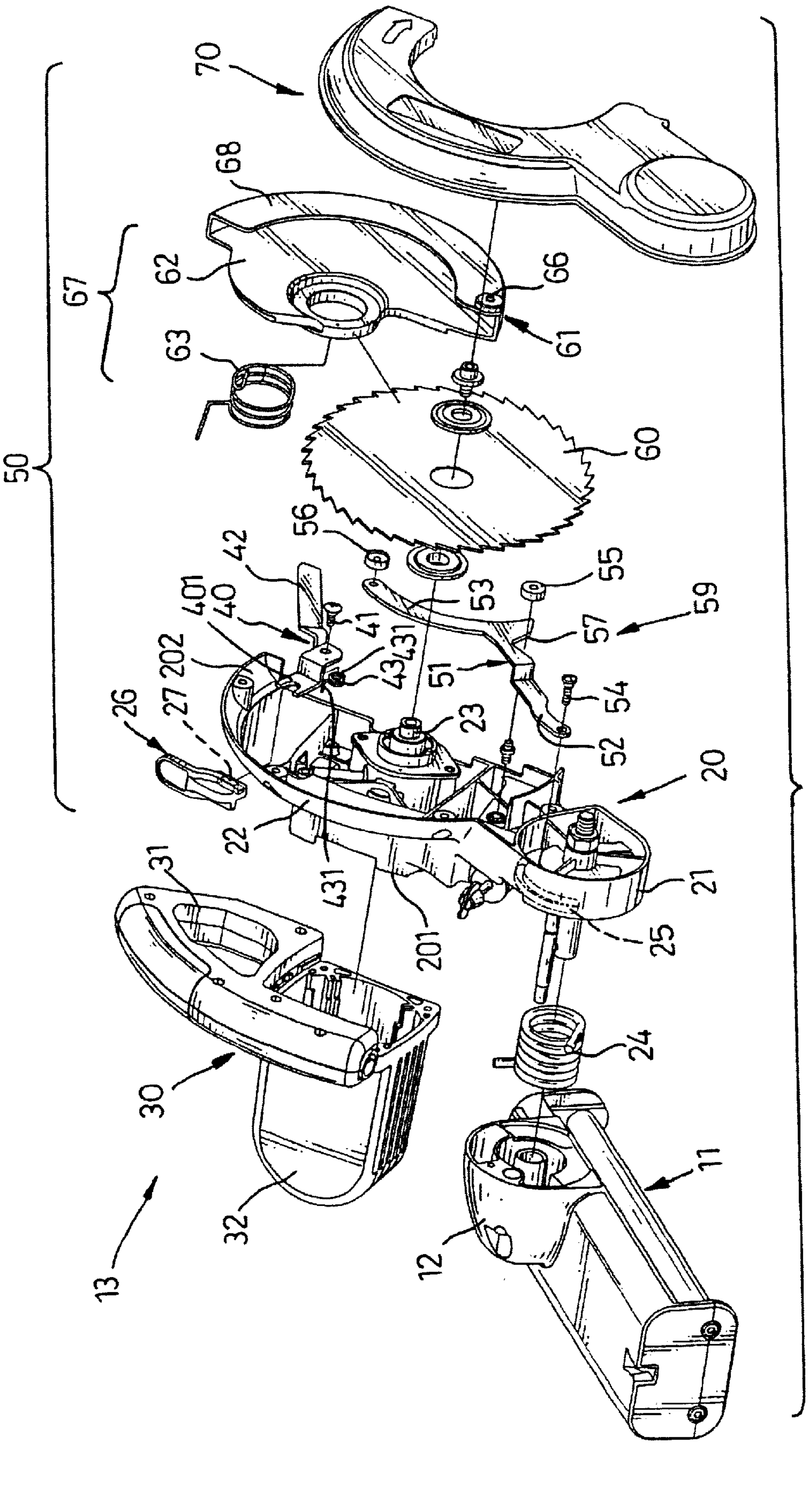
FIG. 2 is an exploded perspective view of the compound miter saw with the guard and control assembly in FIG. 1.

With reference to FIGS. 1 and 2, a compound miter saw comprises a base assembly (10), a bracket assembly (11) and a cutting assembly (13). The bracket assembly (11) has a pivotal connector (12), is mounted on the base assembly (10) and pivotally connects the cutting assembly (13) to the base assembly (10). The cutting assembly (13) has a motor assembly (30), a saw blade (60) and a guard and control assembly (50) in accordance with the present invention. The guard and control assembly (50) is pivotally attached to the bracket assembly (11) and connects the saw blade (60) to the motor assembly (30).

The motor assembly (30) comprises a motor housing (32) and a motor (not shown). The motor housing (32) has a grip (31), and the motor has a drive shaft (not shown). The motor is mounted in the motor housing (32) that is attached to the guard and control assembly (50).

The guard and control assembly (50) comprises an upper blade guard assembly (58), a lower blade guard assembly (67) and a linkage assembly (59). The lower blade guard assembly (67) is attached to the upper blade guard assembly (58) and the linkage assembly (59) and retracts into the upper blade guard assembly (58) when operated.

The upper blade guard assembly (58) comprises an inner housing (20), an outer housing (70) and a coil spring (24). The inner housing (20) and the outer housing (70) are pivotally connected to the pivotal connector (12) of the bracket assembly (11) with the coil spring (24) and correspond to each other to guard a portion of the saw blade (60). The inner housing (20) has a housing connector bracket (21), an inner stationary blade guard (22), an outer side (201) and an inner side (202). The motor housing (32) is attached to the outer side (201) of the inner housing (20). The motor is mounted in the motor housing (32), and the motor drive shaft extends into the inner housing (20) and couples to a spindle (23) to which the saw blade (60) is attached. So, the motor will rotate the saw blade (60).

The housing connector bracket (21) of the inner housing (20) is pivotally attached to the pivotal connector (12) on the bracket assembly (11) and has a curved slot (25). The curved slot (25) is transversally defined through the inner side (202) of the inner housing (20) at the housing connector bracket (21).

The inner stationary blade guard (22) has a shape to accommodate the saw blade (60). The coil spring (24) is mounted between the pivotal connector (12) of the bracket assembly (11) and the housing connector bracket (21) of the inner housing (20) that will provide a restitution force to return the cutting assembly (13).

Figure 3:
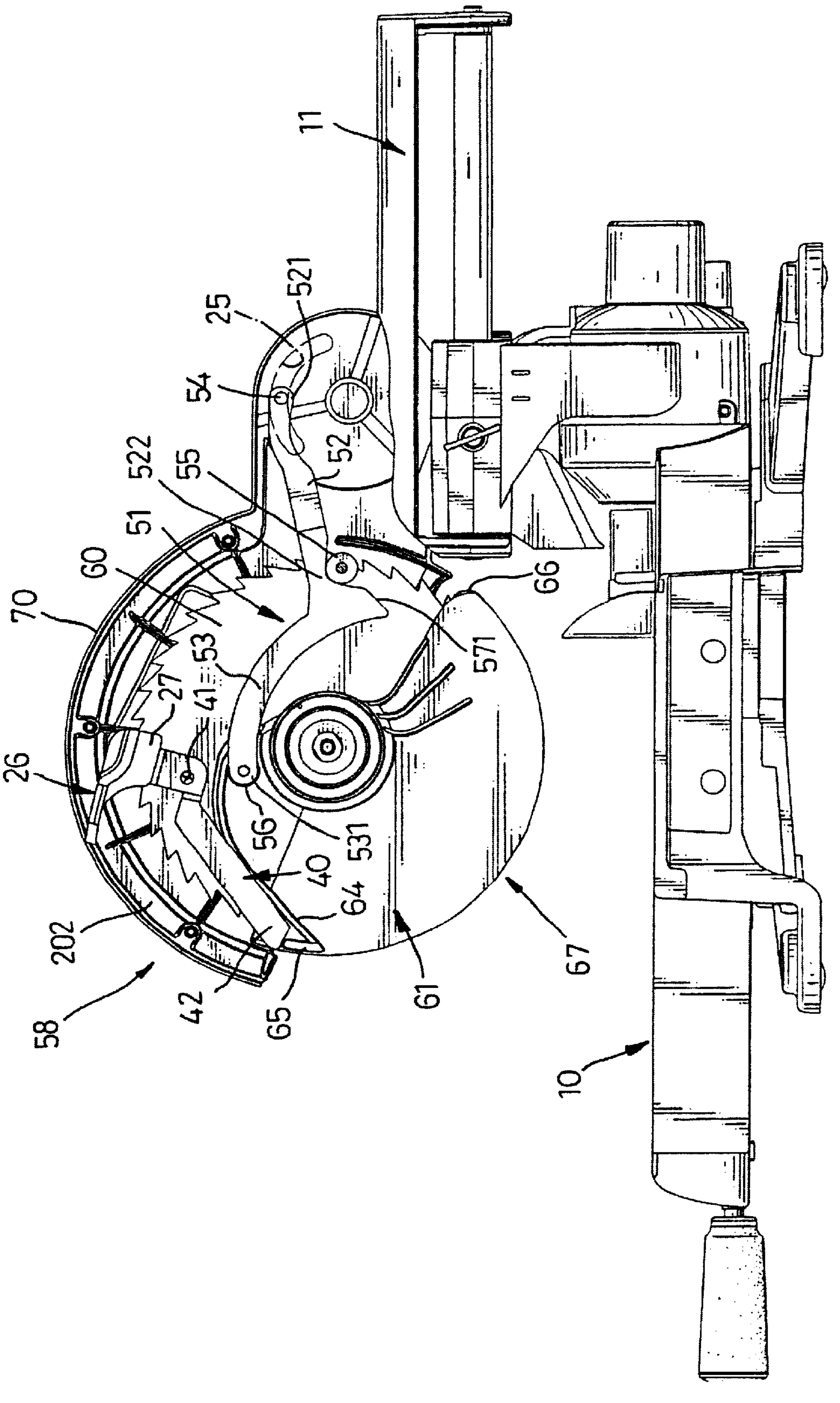
FIG. 3 is a side plan view in partial section of the compound miter saw with the guard and control assembly in FIG. 1.
Figure 4:
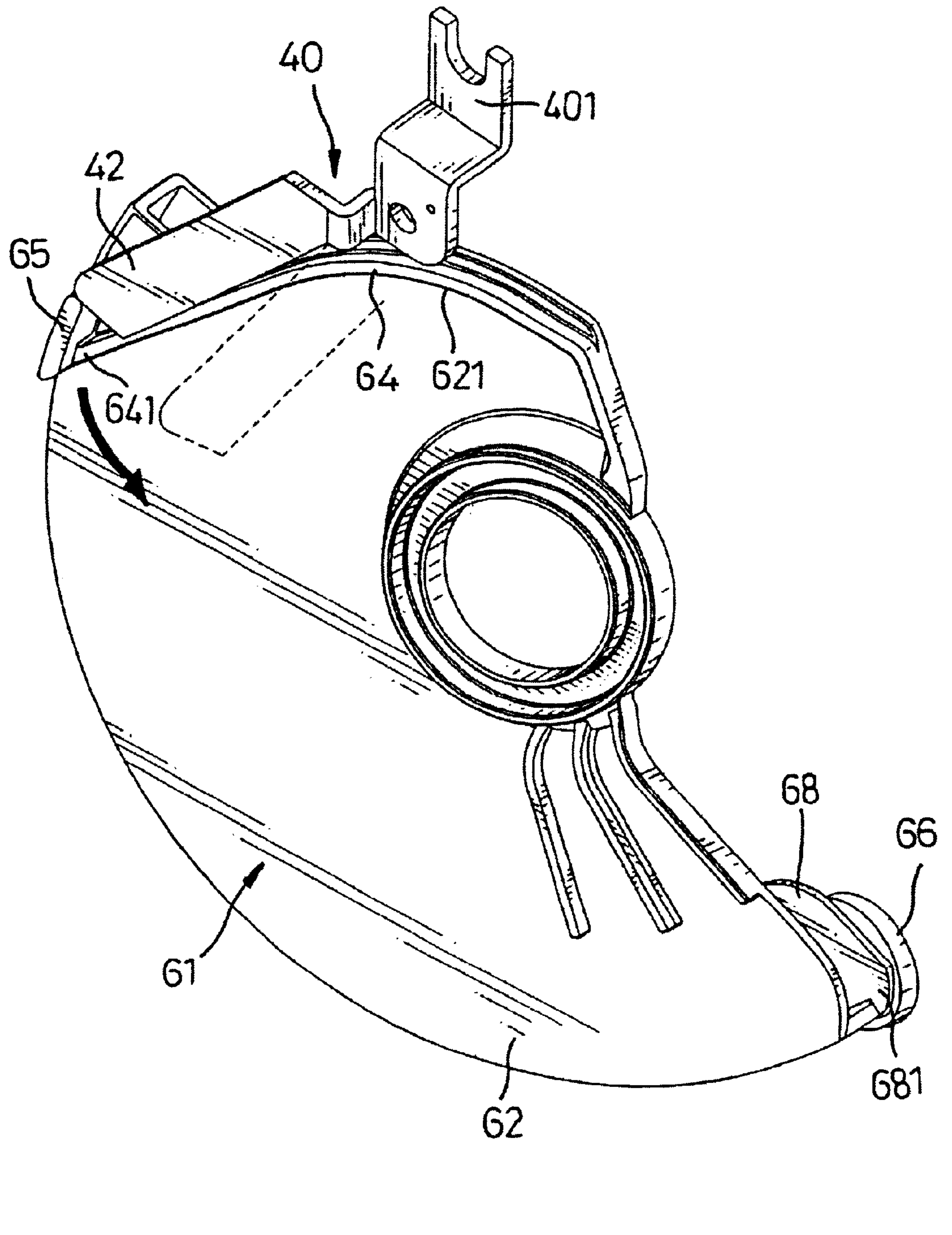
FIG. 4 is an enlarged perspective view of a lower guard assembly of the guard and control assembly in FIG. 2.

With further reference to FIGS. 3 and 4, the lower blade guard assembly (67) is attached to the upper blade guard assembly (58) and comprises a movable guard (61), a coil spring (63) and a roller (66). The movable guard (61) has a side (62), an outer lip (68), a roller guide (64) and a release stop (65) and is pivotally attached to the inner stationary blade guard (22) of the inner housing (20) with the coil spring (63). The movable guard (61) has a smaller diameter than the inner stationary blade guard (22) so the movable guard (61) can be retracted into the inner stationary blade guard (22). The side (62) has a mounting hole (not numbered) that is pivotally mounted on the inner side (202) of the inner housing (20) around the spindle (23) and has an upper edge (621). The roller guide (64) is formed on and protrudes laterally from the upper edge (621) of the side (62) toward the inner housing (20) and has an outside end (641). The release stop (65) is formed at the outside end (641) of the roller guide (64) on the movable guard (61). The outer lip (68) is parallel to the side (62) to guard a portion of the saw blade (60) and has a distal end (681). The roller (66) on the moveable guard (61) is rotatably mounted at the distal end (681) of the outer lip (68) so the moveable guard (61) will move smoothly on an outer surface of a piece (not shown) being cut. The coil spring (63) is mounted between the inner side of the inner housing (20) and the side (62) of the moveable guard (61) to provides a restitution force to close the movable guard (61) around the saw blade (60) when the miter saw is lifted away from the piece being cut.

The linkage assembly (59) is attached to the inner housing (20) and comprises an inner link (51), a fastener (54), a stationary roller (55), a guard roller (56), a lock lever (26), a lock release (40) and a coil spring (43). The inner link (51) is mounted in the inner housing (20) and abuts the roller guide (64) on the movable guard (61). The inner link (51) has a guide portion (52), a roller guide extension (57) and a lever (53). The guide portion (52) has a proximal end (521) and a distal end (522) that is attached to the lever (53) at a junction (not numbered). The lever (53) has a distal end (531). The fastener (54) is attached pivotally to the proximal end (521) of the guide portion (52), passes through the curved slot (25) in the housing connector bracket (21) of the inner housing (20) and is securely attached to the pivotal connector (12). Therefore, the fastener (54) will slide in the curved slot (25) in the housing connector bracket (21) when the saw blade assembly is pivoted.

The roller guide extension (57) protrudes downward from the inner link (51) at the junction with the lever (53) and has an inclined rising edge (571). The stationary roller (55) is rotatably attached to the inner housing (20) and corresponds to the inclined rising edge (571) of the roller guide extension (57). The guide roller (56) is rotatably attached to the distal end (531) of the lever (53) and abuts the roller guide (64) on the movable guard (61).

With reference to FIGS. 2 and 3, the lock release (40) is pivotally attached to the inner side (202) of the inner housing (20) with the coil spring (43) by a fastener (41), such as a bolt. The coil spring (43) is mounted around the fastener (41) and has two ends (431). One end (431) is attached to the inner side (202) of the inner housing (20), and the other end (431) is secured to the lock release (40). The lock release (40) has an arm (42) and a connecting fork (401). The arm (42) corresponds to the release stop (65) on the movable guard (61), and the connecting fork (401) extends out of the inner housing (20). The lock lever (26) is attached to the connecting fork (401) on the lock release (40) and has a bottom recess (27) to hold the connecting fork (401) in position. The coil spring (43) mounted between the inner housing (20) and the lock release (40) provides a restitution force to return the lock release (40) to a locked position.

Figure 5:
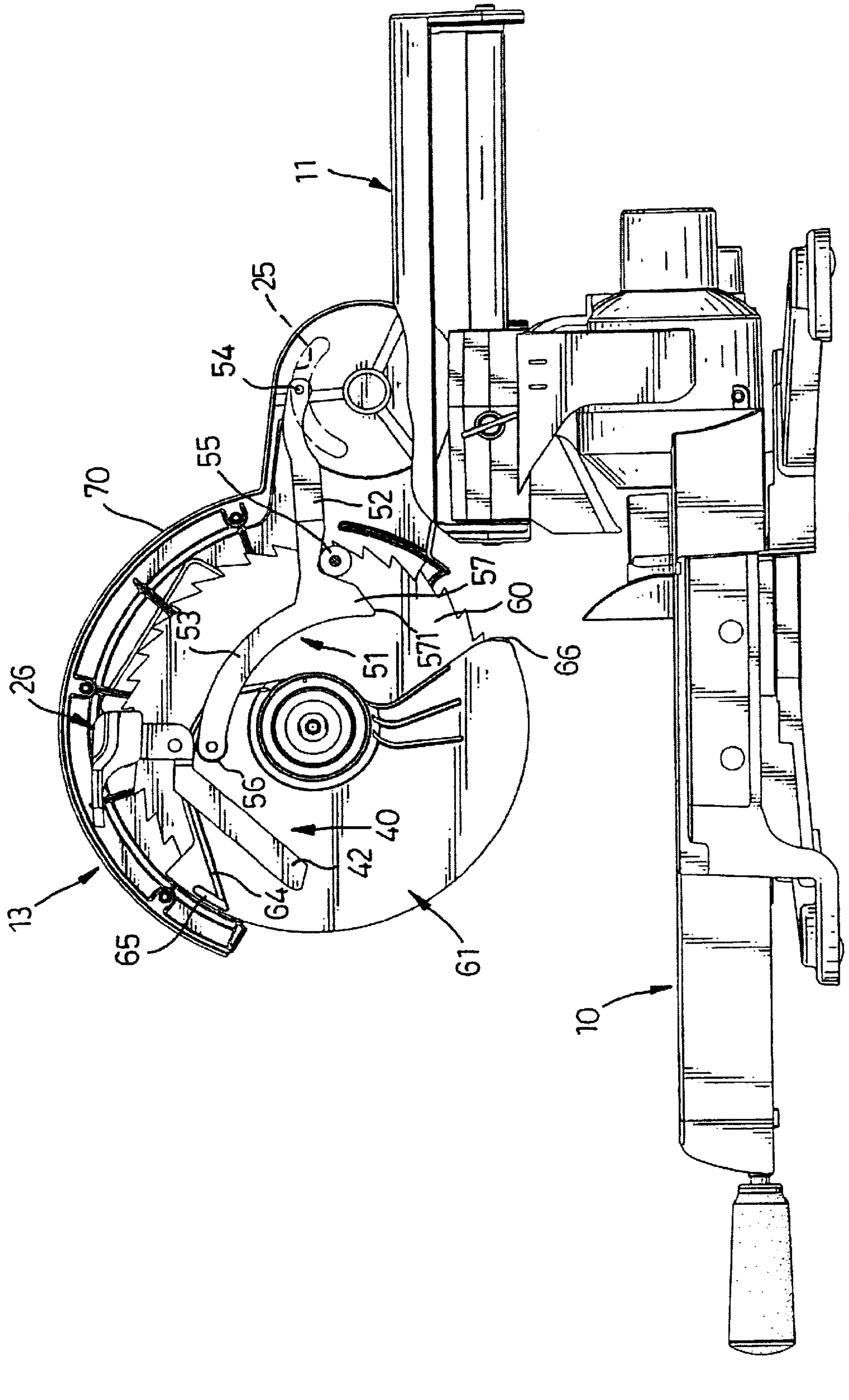
FIG. 5 is an operational side plan view in partial section of the compound miter saw in FIG. 3 when a lock release unlocks the lower guard assembly of the guard and control assembly.
Figure 6:
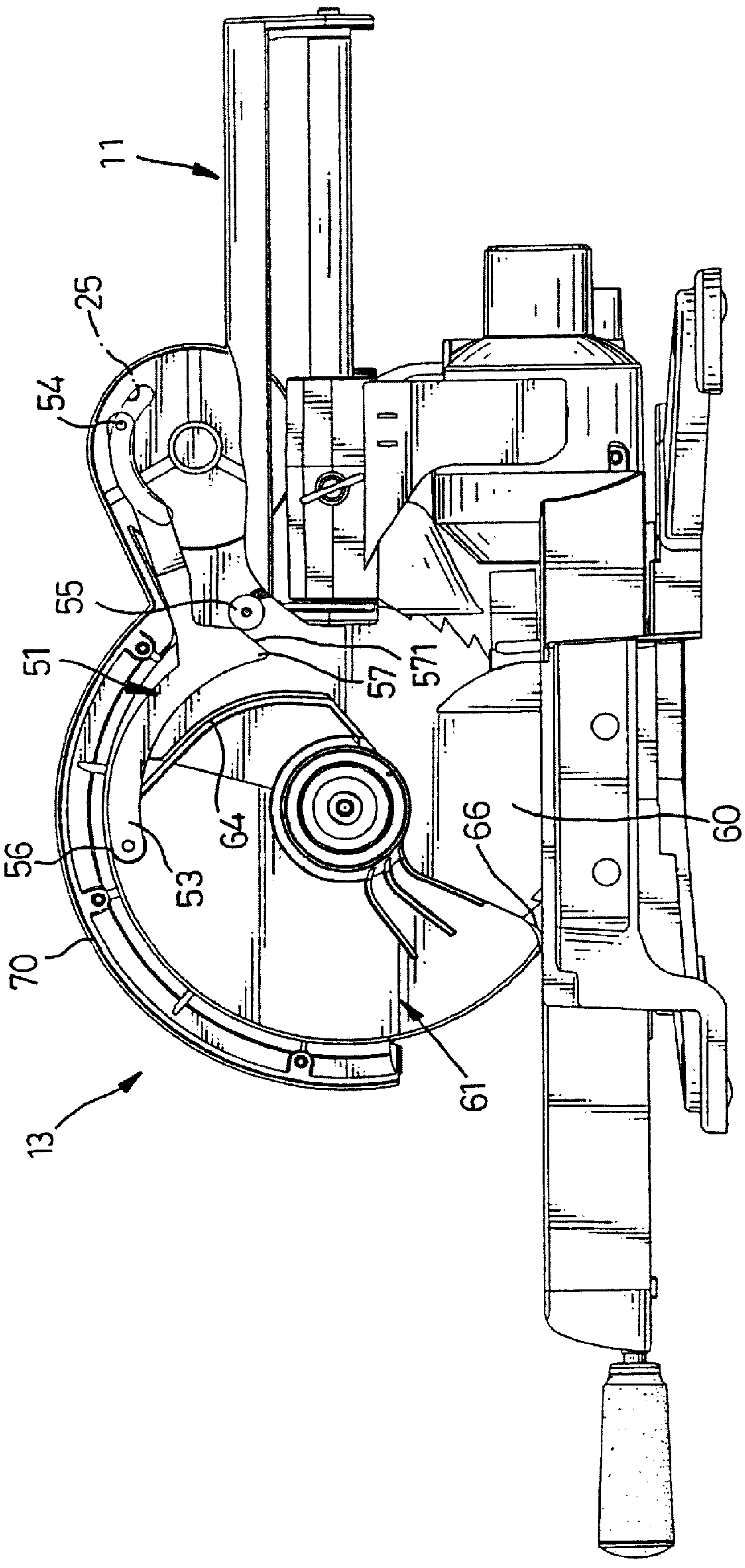
FIG. 6 is an operational side plan view in partial section of the compound miter saw in FIG. 5 when a movable guard on the lower guard assembly is pivoted to allow a saw blade to cut.

With reference to FIGS. 2 and 5, the lock lever (26) is pushed to pivot the arm (42) of the lock release (40) to operate the compound miter saw. The arm (42) will disengage from the release stop (65) on the movable guard (61). With further reference to FIG. 6, the cutting assembly (13) is pivoted downward to cut. When the cutting assembly (13) pivots, the fastener (54) will simultaneously slide in the curved slot (25). The inner link (51) is pivoted down such that the inclined rising edge (571) of the roller guide extension (57) slides on the stationary link roller (55). The inner link (51) will be raised upward along the inclined rising edge (571) of the roller guide extension (57) and cause the guide roller (56) on the lever (53) to roll along the roller guide (64) to retract the movable guide (61). The roller (66) on the moveable guard (61) generally contacts the base assembly (10) so the saw blade (60) is not exposed toward a person operating the miter saw. The movable guard (61) will efficiently cover the saw blade (60).

Figure 7:
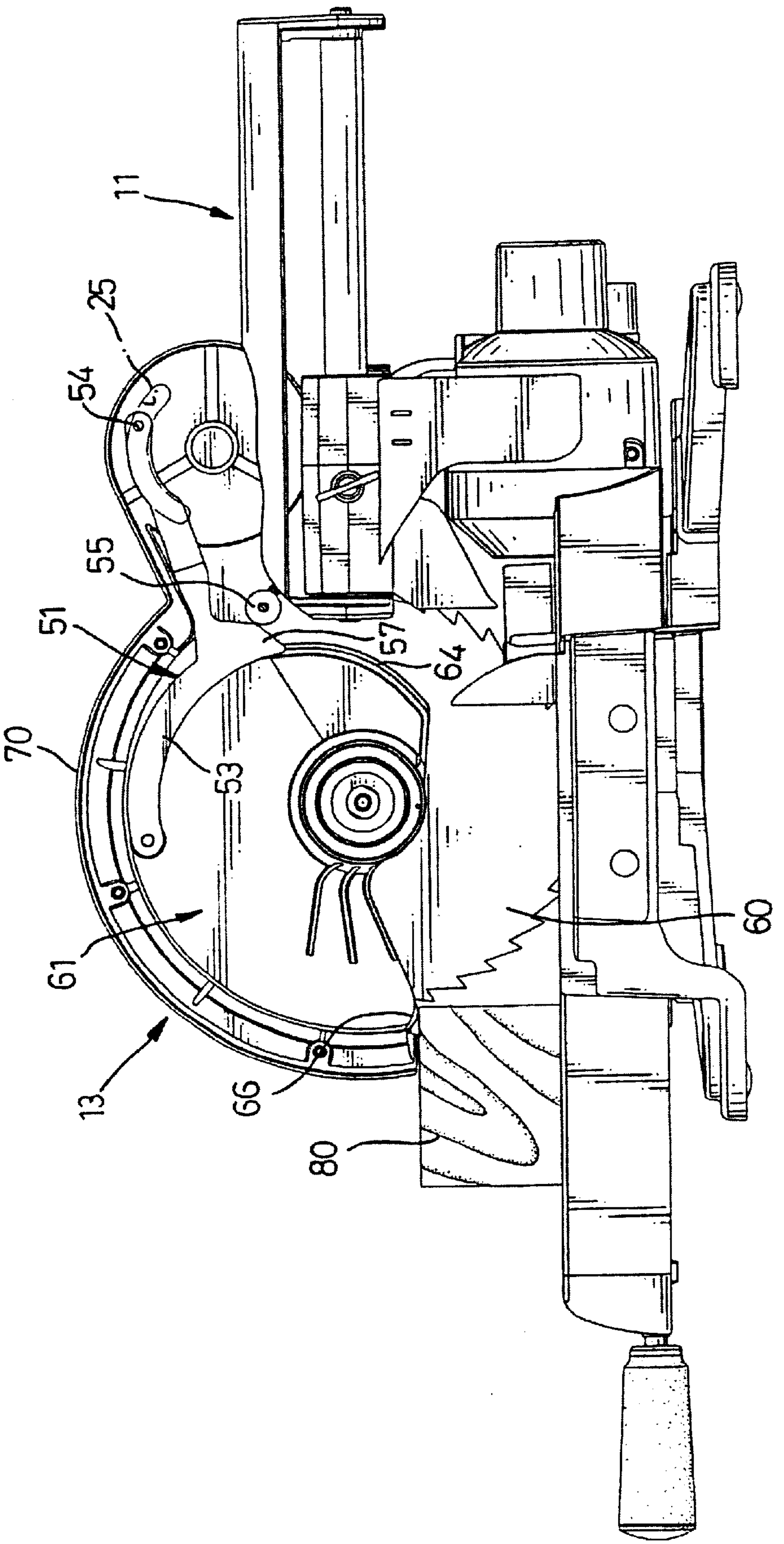
FIG. 7 is an operational side plan view in partial section of the compound miter saw in FIG. 6 when the saw blade completes cutting a piece.
Figure 8:
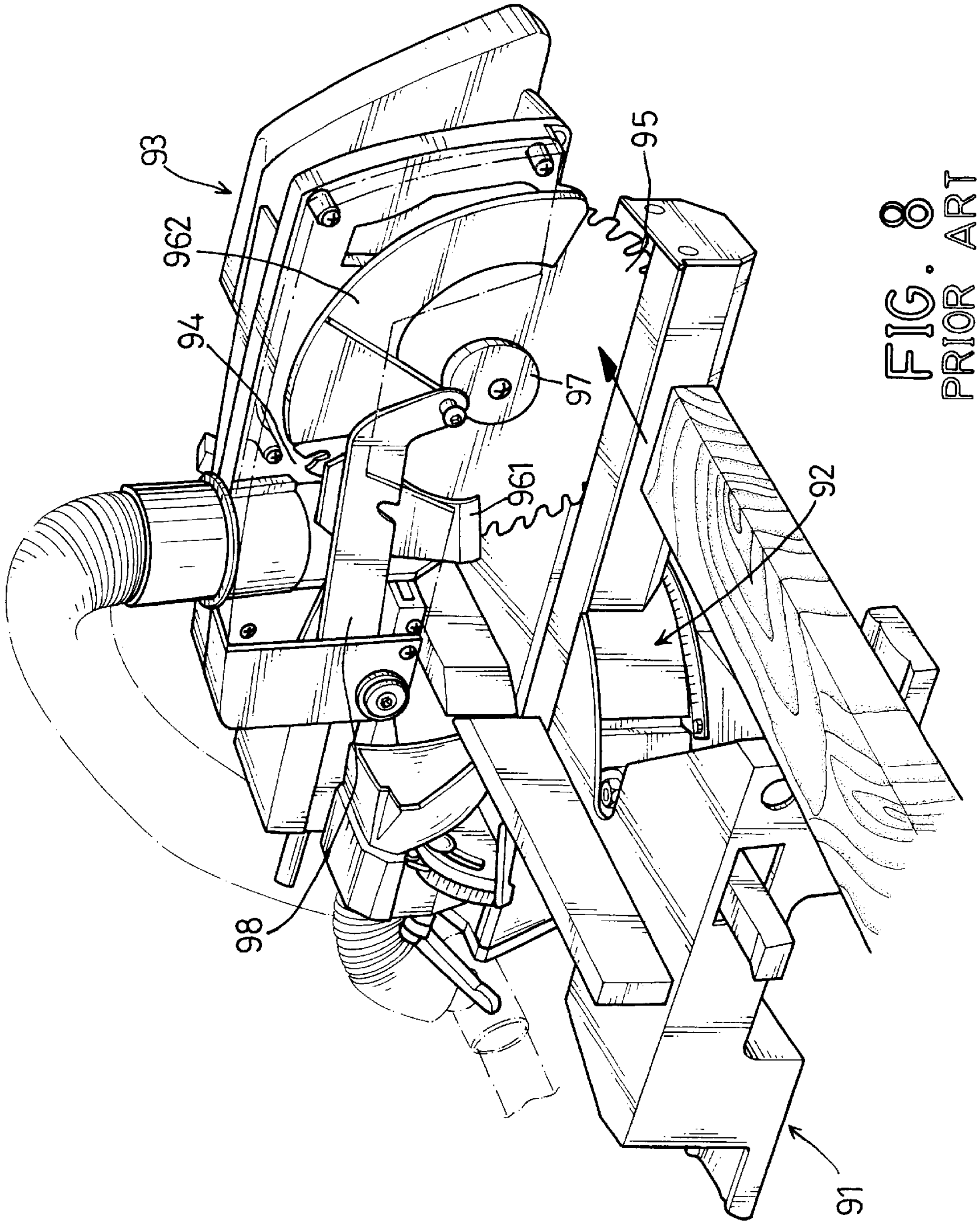
FIG. 8 PRIOR ART
FIG. 8 is a perspective view of a compound miter saw with a conventional guard assembly in accordance with the prior art.

With reference to FIGS. 2 and 7, when the saw blade (60) cuts a piece (80), the roller (66) on the moveable guard (61) will roll along the outer contour of the piece (80). The movable guard (61) is pushed into the inner stationary blade guard (22) to accommodate various heights of pieces to be cut. During a cutting operation, a restitution force is created by the coil spring (63) attached to the moveable guard (61) and pushes the movable guard (61) toward a closed position to cause the roller (66) on the moveable guard (61) to always roll along the outer contour of the piece (80) being cut. Consequently, a person using the miter saw is never exposed to the saw blade (60) when the compound miter saw is performing a cut.

The guard and control assembly (50) in accordance with the present invention prevents an operator from being injured inadvertently by an exposed saw blade (60). The compound miter saw is operated safely. Besides, the guard and control assembly (50) will also almost entirely cover the saw blade (60) in the front direction. The feature prevents debris from the workpiece (80) from being ejected frontward out of the miter saw to injure a person operating the miter saw.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A guard and control assembly for a compound miter saw having a base assembly, a bracket assembly and a cutting assembly with a saw blade, the bracket assembly having a pivotal connector mounted on the base assembly, and the guard and control assembly comprising:

- an upper blade guard assembly adapted to be pivotally attached to the pivotal connector of the bracket assembly, and the upper blade guard assembly comprising
  - a coil spring adapted to be mounted between the pivotal connector of the bracket assembly and the upper blade guard assembly to provide a restitution force to return the cutting assembly;
  - an inner housing adapted to be pivotally attached to the pivotal connector of the bracket assembly with the coil spring and having a housing connector bracket, an inner stationary blade guard, an outer side, an inner side and a spindle, the housing connector bracket adapted to be pivotally attached to the pivotal connector of the bracket assembly with the coil spring and having a curved slot transversally defined through the housing connector bracket, where the spindle is rotatably mounted in and extends out of the inner housing at the inner side of the inner housing and is adapted for the saw blade being rotatably attached to the spindle; and
  - an outer housing corresponding to and attached to the inner housing;
- a lower blade guard assembly attached to the upper guard assembly and comprising
  - a movable guard pivotally attached to the inner stationary blade guard of the inner housing to cover the saw blade and having a side, an outer lip, a roller guide and a release stop, the side has a mounting hole pivotally mounted on the inner side of the inner housing at the inner stationary guard around the spindle and having an upper edge, the roller guide formed at and laterally protruding from the upper edge of the side and having an outside end, and the release stop formed at the outside end of the roller guide on the movable guard, and the outer lip being parallel to the side of the movable guard and having a distal end; and
  - a coil spring mounted between the inner housing and the side of the movable guard to provide a restitution force to return the movable guard; and
- a linkage assembly attached to the inner housing and comprising
  - an inner link pivotally mounted in the inner housing and abutting the movable guard and having
    - a guide portion with a proximal end pivotally mounted in the inner housing at the housing connector bracket;
    - a lever with a distal end attached to the guide portion at a junction; and
    - a roller guide extension protruding downward from the inner link at the junction and having an inclined rising edge;
  - a fastener pivotally attached to the proximal end of the guide portion, slidably passing through the curved slot in the housing connector bracket of the inner housing and adapted to be attached to the pivotal connector of the bracket assembly;
  - a stationary roller rotatably mounted in the inner housing and slidably abutting against the inclined rising edge of the roller guide extension; and
  - a guard roller rotatably attached to the distal end of the lever and abutting the roller guide on the movable guard.

2. The guard and control assembly as claimed in claim 1, wherein the linkage assembly further comprises

- a lock release pivotally attached to the inner side of the inner housing by a fastener, the lock release having
  - an arm corresponding to the release stop on the movable guard;
  - a connecting fork extending out of the inner housing; and
  - a lock lever attached to the connecting fork of the lock release and having a bottom recess to hold the connecting fork in position; and
- a coil spring having two ends and mounted around the fastener between the lock release and the inner housing where the two ends are attached respectively to the inner housing and the lock release;
- where the coil spring mounted between the lock release and the inner housing provides a restitution force to return the lock release to a locked position.

3. The guard and control assembly as claimed in claim 1, wherein a roller is rotatably mounted at the distal end of the outer lip of the moveable guard so the moveable guard will slide on an outer contour of a piece being cut.

4. The guard and control assembly as claimed in claim 2, wherein a roller is rotatably mounted at the distal end of the outer lip of the moveable guard so the moveable guard will slide on an outer contour of a piece being cut.

5. The guard and control assembly as claimed in claim 3, wherein the movable guard has a diameter smaller than the inner stationary blade guard so the movable guard can be retracted into the inner stationary blade guard when the miter saw is operated.

6. The guard and control assembly as claimed in claim 4, wherein the movable guard has a diameter smaller than the inner stationary blade guard so the movable guard can be retracted into the inner stationary blade guard when the miter saw is operated.

* * * * *